UNITED STATES PATENT OFFICE.

RASIK LAL DATTA, OF CALCUTTA, INDIA.

MANUFACTURE OF CAFFEIN.

1,350,092.   Specification of Letters Patent.   Patented Aug. 17, 1920.

No Drawing.   Application filed October 17, 1919.   Serial No. 331,428.

*To all whom it may concern:*

Be it known that I, RASIK LAL DATTA, a subject of British India, residing at Calcutta, India, have invented certain new and useful Improvements in the Manufacture of Caffein, of which the following is a specification.

This invention relates to the manufacture of caffein from tea.

The process forming the object of the present invention has for its purpose the extraction of caffein from tea waste more cheaply and more readily than by the processes hitherto known.

The extraction of caffein is usually done by treating the aqueous extract of tea with basic or ammoniacal or pure lead acetate or with leady hydroxid to precipitate the tannin and albumin present in the extract. The liquor after filtering off the precipitate thus obtained is evaporated for the crystallization of caffein. Other methods have also been in use in which the tea extract is evaporated with lime or magnesia and the dry mixture is extracted with chloroform for extracting the caffein contained in it.

According to this invention, the tea extract is precipitated with lime preferably with milk of lime whereby nearly three-fourths of the total quantity of tannin and albumin is precipitated. The liquid thus obtained after filtering off the precipitates formed is treated with a solution of basic or ammoniacal or pure lead acetate or with lead hydroxid to finally precipitate the remainder of the tannin and albumin which remains unprecipitated by lime. The resulting liquor after evaporation yields all the caffein contained in it.

The usefulness of my invention consists in reducing the quantity of the expensive lead salts required to only a quarter of what has been hitherto necessary to completely precipitate the tannin and albumin contained in tea extract.

To carry out my invention to effect, I add milk of lime to a strong aqueous extract of tea when a flocculent precipitate is formed. The addition of milk of lime is continued till the precipitation is complete. The precipitate thus formed is filtered off and the last portions of the mother liquor are secured by means of a filter press. This liquor which contains all the caffein originally present in the tea extract is finally precipitated with a solution of basic lead acetate or pure lead acetate or with lead hydroxid when all the tannin and albumin is precipitated. The liquor after finally filtering off the lead precipitate is evaporated to crystallization when pure caffein crystallizes out.

A typical experiment carried out with extract from 100 grms. of tea gives the following results:

Total quantity of lead as lead acetate required to effect complete precipitation of tannin and albumin=15.84 grms.

Total quantity of lead as basic lead acetate required to effect the complete precipitation of tannin and albumin after precipitation with lime=4.08 grms.; the total quantity of lime required for the above purpose being 6.51 grms.

What I claim as my invention and desire to secure by Letters Patent is:

As a new process of manufacture the process of precipitation of remaining tannin and albumin from tea extract by means of basic or simple lead acetate or lead hydroxid after the partial precipitation of tannin and albumin by milk of lime for the production of caffein.

In testimony whereof I affix my signature in presence of two witnesses.

RASIK LAL DATTA.

Witnesses.
  E. L. ELLIS,
  L. ARCHARD.